United States Patent [19]

Gellerman

[11] Patent Number: 4,887,966

[45] Date of Patent: Dec. 19, 1989

[54] FLIGHT SIMULATION CONTROL APPARATUS

[76] Inventor: Floyd R. Gellerman, 2292 Mountain Ave., Scotch Plains, N.J. 07076

[21] Appl. No.: 213,590

[22] Filed: Jun. 30, 1988

[51] Int. Cl.$^4$ ............................................. G09B 9/08
[52] U.S. Cl. .................................. 434/45; 273/148 B
[58] Field of Search ...................... 434/45; 273/148 B

[56] References Cited

U.S. PATENT DOCUMENTS

| | | |
|---|---|---|
| 3,909,523 | 9/1975 | Bartucci . |
| 4,055,004 | 10/1977 | Chase . |
| 4,207,688 | 6/1980 | Derderian . |
| 4,348,186 | 9/1982 | Harvey . |
| 4,457,716 | 7/1984 | Eserhaut . |
| 4,478,407 | 10/1984 | Manabe ................................ 434/45 |
| 4,659,313 | 4/1987 | Kuster et al. ......................... 434/45 |
| 4,713,007 | 12/1987 | Alban .................................. 434/45 |

Primary Examiner—Leo P. Picard
Attorney, Agent, or Firm—Leon Gilden

[57] ABSTRACT

The present invention relates to flight simulation control apparatus, and more particularly pertains to the field of computer game controllers which are used for the control of games being played on a personal computer. In the present invention, the controller takes the form of a control yoke similar to the one used in actual aircraft with a control wheel, a forward and back movement mechanism, and a throttle. The controllers interface with the computer through the use of a game port on the computer. The game ports are of a standard design and are common on many computers.

7 Claims, 8 Drawing Sheets

FLIGHT SIMULATION CONTROL APPARATUS

BACKGROUND OF THE INVENTION

1. Field of the Invention

The present invention relates to flight simulation control apparatus, and more particularly pertains to the field of computer game controllers which are used for the control of games being played on a personal computer. In the present invention, the controller takes the form of a control yoke similar to the one used in actual aircraft with a control wheel, a forward and back movement mechanism, and a throttle. The controllers interface with the computer through the use of a game port on the computer. The game ports are of a standard design and are common on many computers.

2. Description of the Prior Art

Various types of flight simulation control apparatus are known in the prior art. A typical example of such a flight simulation control apparatus is to be found in U.S. Pat. No. 3,909,523 which issued to John F. Bartucci and which shows the use of a flight simulator for the simulation of flight for the purpose of training. U.S. Pat. No. 3,949,490 which issued to George Derderian et al shows the use of separate steering and throttle controls in a flight simulation environment. U.S. Pat. No. 4,055,004 which issued to Wendell D. Chase shows the use of a control yoke in a flight simulator. U.S. Pat. No. 4,207,688 which issued to George Derderian shows the use of a control stick for the control of a flight simulator. U.S. Pat. No. 4,348,186 which issued to James F. Harvey shows the use of a control stick in a simulation environment. U.S. Pat. No. 4,478,407 which issued to Katsuki Manabe shows the use of a control yoke in a video game simulator. The yoke is used for control input and generates feedback to the operator. In addition to the above mentioned patents, there are known in the prior art devices called joysticks. These devices have a stick which connects to four directional switches. These switches control movement in four orthogonal directions.

While the above mentioned devices are suited for their intended usage, none of these devices discloses the instant invention, which provides a simple flight simulation controller with both a yoke for directional input and a throttle for thrust input to a video game. This controller can connect to the game ports of many computers and takes the place of two of the simpler prior art controllers which can only provide directional control. Inasmuch as the art is relatively crowded with respect to these various types of flight simulation control apparatus, it can be appreciated that there is a continuing need for and interest in improvements to such flight simulation control apparatus, and in this respect, the present invention addresses this need and interest.

SUMMARY OF THE INVENTION

In view of the foregoing disadvantages inherent in the known types of flight simulation control apparatus now present in the prior art, the present invention provides an improved flight simulation control apparatus. As such, the general purpose of the present invention, which will be described subsequently in greater detail, is to provide a new and improved flight simulation control apparatus which has all the advantages of the prior art flight simulation control apparatus and none of the disadvantages.

To attain this, representative embodiments of the concepts of the present invention are illustrated in the drawings and make use of a control yoke and throttle mechanism. The control yoke is mounted in a housing and is disposed so that it can move forward and back and can rotate both clockwise and counter-clockwise. This provides the directional input needed for most video games. Additionally, the device provides a throttle mechanism which actuates a throttle switch which generates input to the computer to which the device is connected.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flight simulation control apparatus which has all the advantages of the prior art flight simulation control apparatus and none of the disadvantages.

It is another object of the present invention to provide a new and improved flight simulation control apparatus which may be easily and efficiently manufactured and marketed.

It is a further object of the present invention to provide a new and improved flight simulation control apparatus which is of a durable and reliable construction.

An even further object of the present invention is to provide a new and improved flight simulation control apparatus which is susceptible of a low cost of manufacture with regard to both materials and labor, and which accordingly is then susceptible of low prices of sale to the consuming public, thereby making such flight simulation control apparatus economically available to the buying public.

Still yet another object of the present invention is to provide a new and improved flight simulation control apparatus which provides in the apparatuses and methods of the prior art some of the advantages thereof, while simultaneously overcoming some of the disadvantages normally associated therewith.

Still another object of the present invention is to provide a new and improved flight simulation control apparatus which provides an improved game controller which economically replaces the functions performed by two conventional controllers.

Yet another object of the present invention is to provide a new and improved flight simulation control apparatus which has the addition of a throttle control which provides input to a game port of a computer.

Even still another object of the present invention is to provide a new and improved flight simulation control apparatus with a more natural interface to game which simulates flying by providing a more realistic aircraft type flight control yoke than those currently on the market.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic of the LED circuit used in the controller of the present invention.

DESCRIPTION OF THE PREFERRED EMBODIMENT

Figure 1:
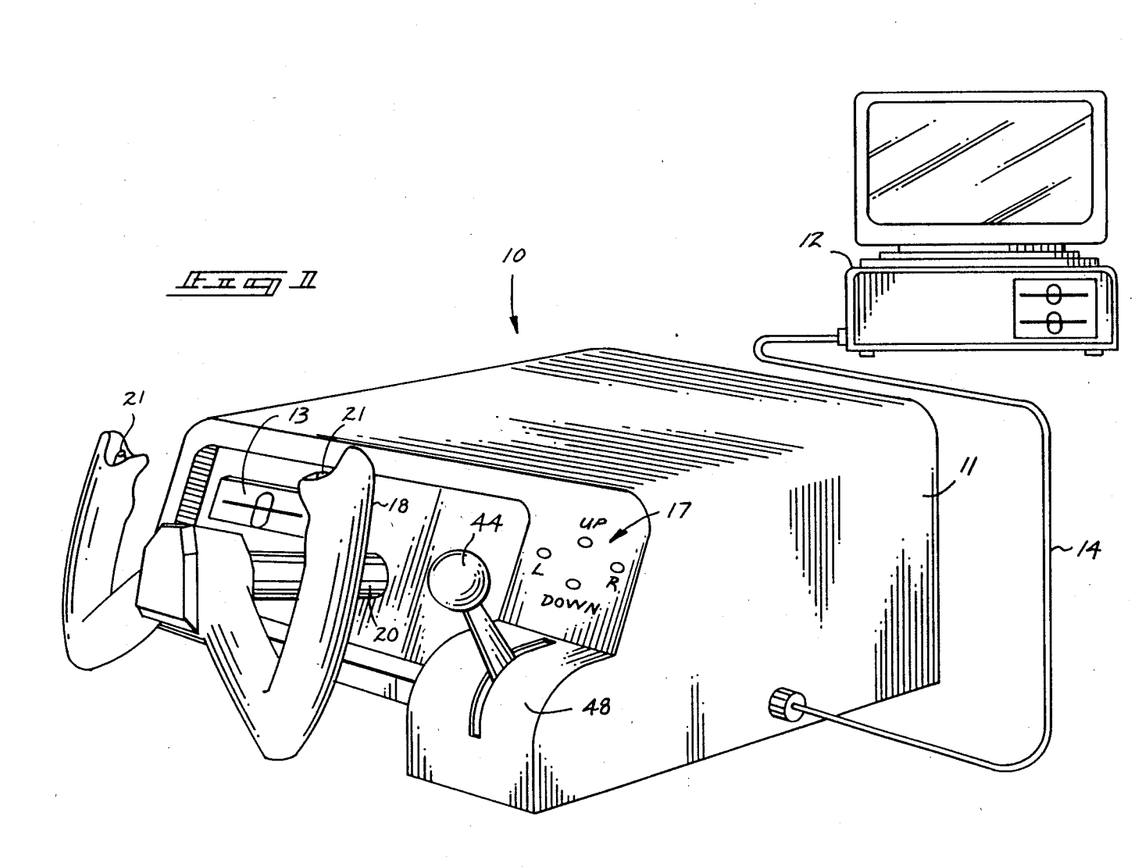
FIG. 1 is a perspective view of the flight simulator control device of applicant's invention.

With reference now to the drawings, and in particular to FIG. 1 thereof, a new and improved flight simulation control apparatus embodying the principles and concepts of the present invention and generally designated by the reference numeral 10 will be described.

More specifically, it will be noted that the first embodiment 10 of the invention includes a housing 11 which contains the operative elements of applicants device. These include the cable 14 which connects the device to the computer 12 with which it is used. A disk drive 13 may optionally be incorporated in the housing 11, for use with computers not provided with a compatible disk drive unit. Associated with the housing 11, are a control shaft 20 to which the control yoke 18 is connected. On the control yoke 18 are two buttons 21 which are firing buttons and provide input to the computer 12 through cable 14. Additionally, the housing 11 contains a throttle 44 which is used by some games which are capable of input beyond just the directional information provided by the control yoke 18 and the firing information from the firing buttons 21. Additionally, there is a set of four LED's 17, on the front of the console 11 that are labelled left, right, up and down. These are connected to a set of switches inside the console 11 and provide a visual indication of whether the switches have been activated.

Figure 2:
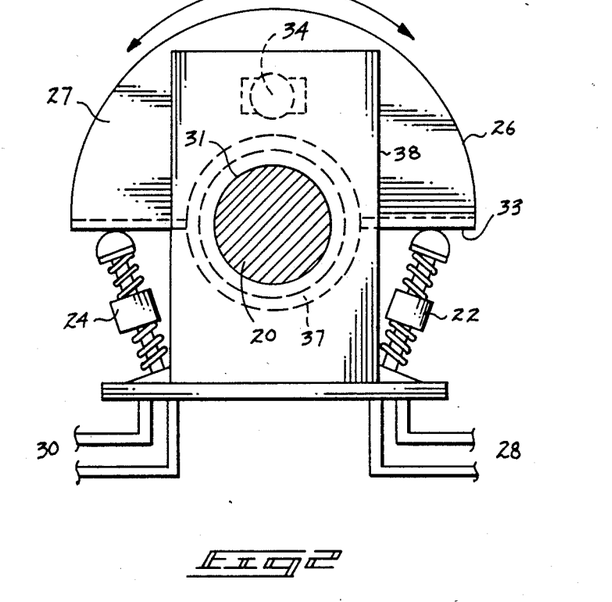
FIG. 2 is an internal view showing the control shaft as viewed from the front of the device.

Referring now to FIG. 2, there is a saddle assembly 26 which is mounted on the control shaft 20. This saddle 26 is mounted inside the housing 11 and is positioned above the two switches 22 and 24 which provide the left and right directional inputs to the computer 12 connected to the controller. The saddle 26 is formed by two side pieces 27 and 29 which are semicircular in shape with a semicircular cutout 31 in the center of the flat side 33 so that each piece 27 and 29 is in the shape of a half annulus. The ends of each annulus are connected by a flat piece of material 35 to form the upper part of the saddle 26. The upper piece of the saddle 26 is connected to a cylindrical piece of material 37 which fits into the center cutouts 31 of the side pieces to complete the saddle. The saddle 26 can then be placed on the shaft 20 and slid to final position prior to fixing it in place. The saddle 26 is situated above the directional switches 22 and 24 which are placed at an angle so that they contact the bottom 33 of the saddle at a right angle. This adds to the durability of the device since it will minimize the bending forces applied to the switches. The switches are each of a double pole single throw type and are momentary off switches. The double pole design is so that each switch can send input to the computer and complete a circuit which lights one of the LED's 17 on the console 11 to show that the connection has been made. These inputs are transmitted through the wires 28 and 30 which are connected to the two switches respectively. In addition, each of the switches is spring mounted so that they provide a centering action to the control yoke by providing a rebound force when actuated.

Figure 3:
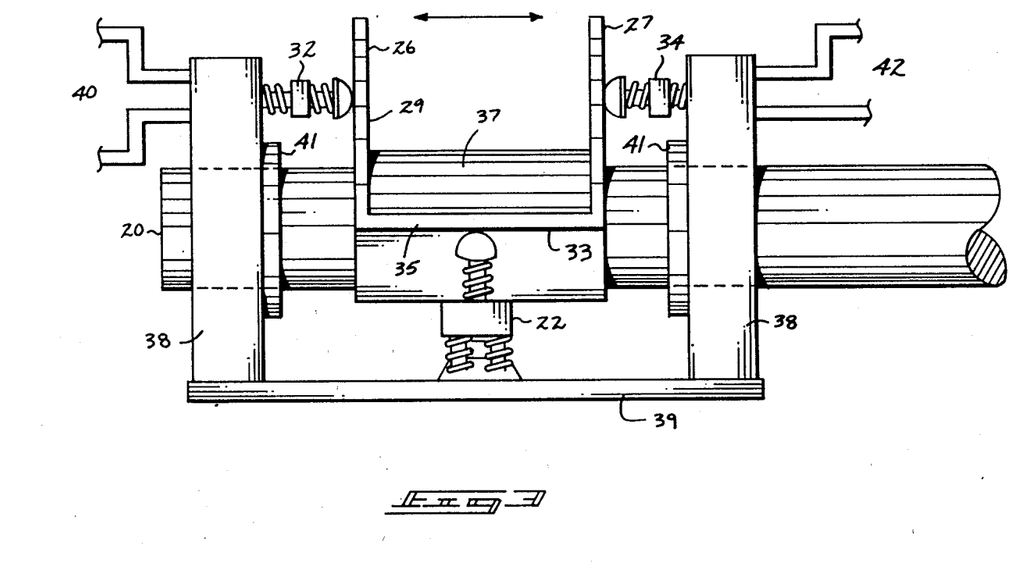
FIG. 3 is an internal view showing the control shaft form the side.

Referring now to FIG. 3, there is illustrated a side view of the saddle shown in FIG. 2. In this view, it may be seen that the control shaft 20 is supported by two blocks 38 which have a hole in the center provided with a journal bearing 41 for the control shaft. These blocks 38 hold the shaft 20 in place vertically and provide a surface for the mounting of switches 32 and 34 which provide directional input to the computer. As the shaft 20 is moved as indicated by the arrow by pulling on the yoke 18, the sides 26 of the saddle 26 contact the switches and provide input to the computer. As with the turn switches 22 and 24, each of the switches 32 and 34 is a double pole single throw momentary on switch. As the contact is made it sends a signal through the wiring harness' 40 and 42. Each of the wiring harness' 40 and 42 has two wires, one for the computer input and one for the LED 17 circuit which provides a visual indication that the contact has been made.

Figure 4:
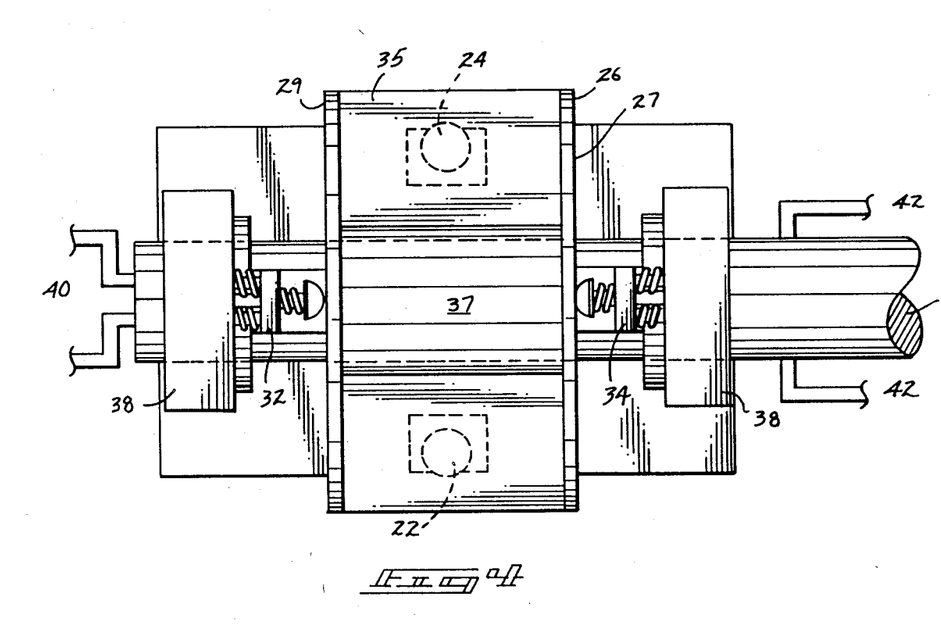
FIG. 4 is and internal view showing the control shaft from the top.

FIG. 4 is a top view of the saddle shown in FIGS. 2 and 3. The saddle 26 is situated on the shaft 20 between switches 32 and 34 and above switches 22 and 24. As the shaft is moved forward and backward, it will contact the up and down switches 32 and 34, and as it is rotated, it will contact the turn switches 22 and 24. These switches will in turn send the signal to both the computer and the LED indicators 17 on the front panel on the control console 11.

Figure 5:
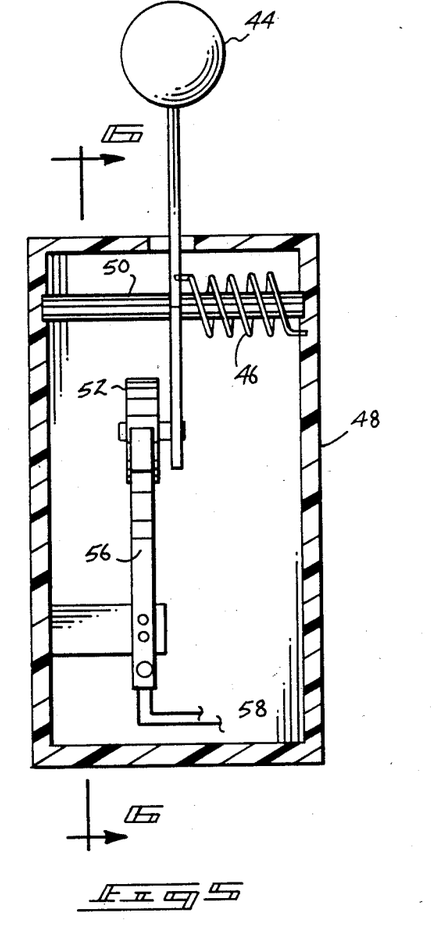
FIG. 5 is an internal view of the throttle lever as viewed from the front of the device.

FIG. 5 is a cutaway view of the throttle control lever mechanism 44. The throttle lever is mounted in a housing 48 on the front of the console 11 as can be seen in FIG. 1. In this view the throttle lever pivot rod 50 is shown. The throttle 44 is mounted on the pivot shaft 50 and is free to rotate. Connected to the throttle lever 44 is a return spring 46 which is in a normal unflexed state when the throttle 44 is in a neutral position. When the throttle 44 is pushed or pulled, the spring 46 will serve to return the lever 44 to the neutral position. When the throttle is pushed it will rotate and the contact cam 52 will touch the switch contacts 56 and complete the circuit. This is more clearly see if FIG. 6, which is a side view of the throttle mechanism. When the switch is closed, it sends input through the connecting cable 14 to the computer 12. The throttle is not used with all games since it sends to inputs to the second joystick port contained in a standard game port of a computer. The switch is a single pole single throw and provides only the input to the computer and does not connect to an LED like the directional switches.

Figure 6:
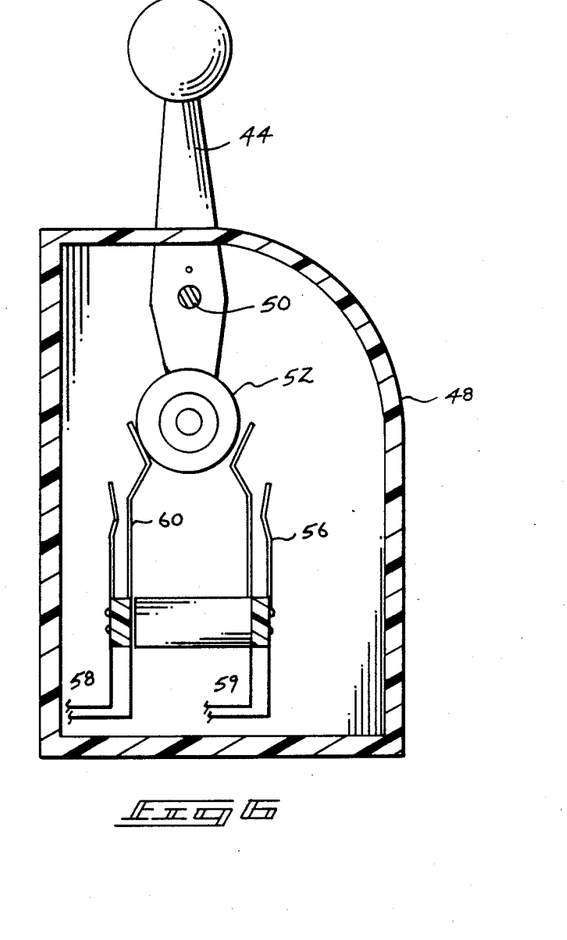
FIG. 6 is an internal view of the throttle lever as viewed from the side.

FIG. 6 is a side view of the throttle lever mechanism shown in FIG. 5. The throttle lever 44 is mounted for rotation on shaft 50. When the top of the lever 44 is pushed or pulled the cam 52 comes into contact with the throttle switches 56 and 60. These in turn send a signal to the computer indicating that the throttle 44 has been either moved forward or backward. The signal is sent through the wiring 58 and 59 to the cable 14. The return spring 46 returns the throttle lever 44 to its neutral state in which neither switch is actuated.

FIG. 7 is a schematic of the wiring harness for the LED circuit. When the turn switches 22, 24 or up or down switches 32, 34 are activated, they send a signal to the computer and complete the circuit shown here to light the corresponding one of the LEDs 17 on the console 11 to indicate that contact has been made. This is used to provide instant feedback to the user since the game may not respond immediately and the user may therefore end up turning or changing altitude more than they intended. Since the LEDs 17 provide instant feedback, the user will know immediately if the controller has responded to the input without waiting for the game to give some kind of response. When each of the switches 22, 24, 32 and 34 are actuated, they complete the circuits through lines 28, 30, 40 and 42. When the circuit is complete, it places the LEDs in series with the nine volt battery 64 and resistor 62 which drops the current level. This in turn lights the appropriate LEDs 17 on the console 11 telling the user that the switch or switches have been activated.

Figure 8:
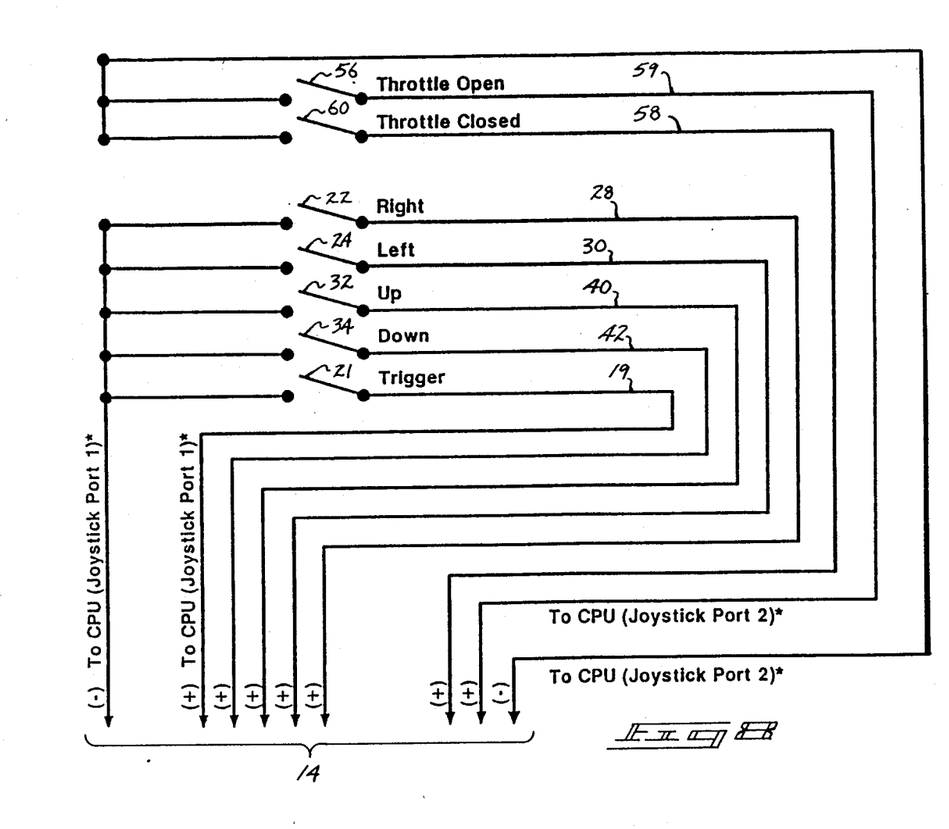
FIG. 8 is a schematic of the wiring harness used to connect the controller of the present invention to a computer.
Figure 11:
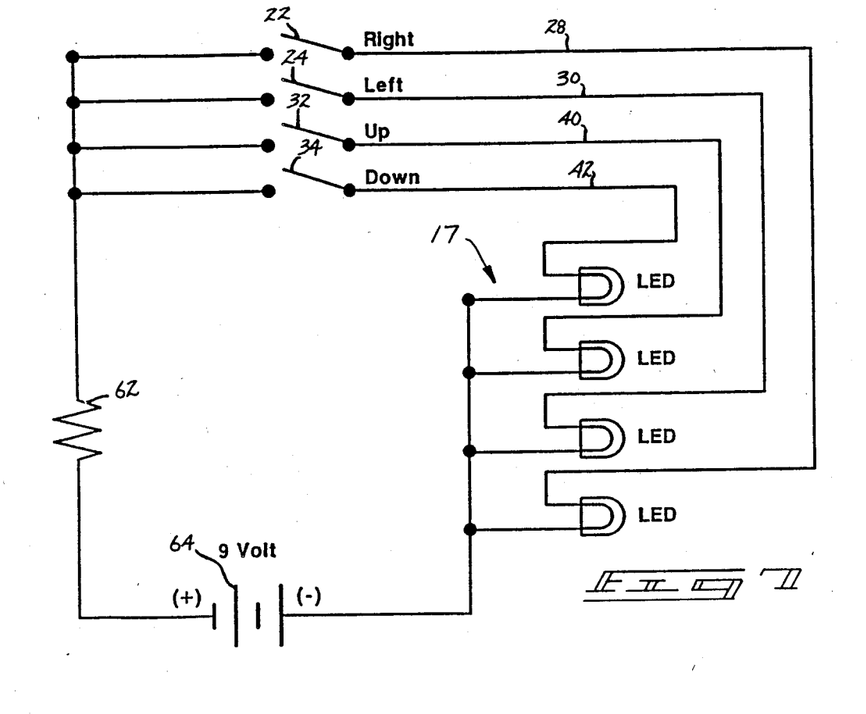

FIG. 8 is a schematic of the wiring which connects the controller to the computer through the game port. Each of the game ports on the computer has a negative line and a series of positive lines, usually at least five. This allows for at least four directions and a firing button. When the controller switches are closed they complete these circuits. This signals the computer that an input has been received from the controller and the computer responds accordingly. In the instant application, the directional switches 22, 24, 32, 34 and the trigger switch 21 are connected to game port one through the harness. The throttle switches 56 and 60 are connected to game port two through the harness. The harness is made up from wires 59, 58, 28, 30, 40, 42 and 19 which are connected to the throttle, the turn switches and the trigger respectively. In most MS-DOS(TM) type computers this wiring harness has one end which connects to the game port on the PC. Each standard game port on a PC can support two joysticks. Therefore, it would only be necessary to have one connector on the end of the harness 14. On some other machines, it might be necessary to have two connectors, one for each joystick port.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patents of the United States is as follows:

1. A flight simulation control apparatus comprising:
a console which can be mounted on a planar surface,
a cylindrical control shaft mounted in said console for reciprocal linear sliding and reciprocal rotary movement,
a control yoke on the end of said control shaft for controlling movement of the shaft,
trigger buttons on the ends of the control yoke to activate a firing circuit,
a throttle lever mounted on said console to activate a throttle circuit,
a wiring harness for connecting said controller to a computer, and
a set of four LEDs on the front of the console to indicate actions of the control shaft, and
wherein said control yoke is in the shape of a "U" and is connected to the forward end of the control shaft at the bottom of the "U" shaped portion, and
wherein said control shaft is mounted in a hole in the front of said console, and
wherein said control shaft is supported inside said console by two blocks which are parallel to the front of the console and perpendicular to the base of said console,
wherein each of the two block has a hole to receive the shaft, and
wherein each of the holes are coaxial with the first hole in front panel of the console and large enough to allow the shaft to pass through and rotate, and
wherein between the blocks supporting the control shaft there is a saddle shaped member comprising, two flat plates which are coplanar with the rotational axis of the control shaft and extend outwardly from the exterior surface of the control shaft, two flat semi-circular side members with a semi-circular cutout, thereby forming a half annular member, wherein said side member are located with the cutout portion against the curved surface of the control shaft and with the flat part of the perimeter of the side member in contact with the forward and rearward edges of the projecting flat plates which are coplanar with the control shaft axis, and wherein there are switches mounted around the saddle shaped member for providing directional inputs to the computer comprising, spring biased switches mounted in a plane parallel to the plane of the support blocks, and beneath the flat plate and sized so that they touch the bottom of the plate when in a neutral state, so that they will be compressed when the shaft is rotated thereby providing a left and right signal, spring biased switches which are mounted on the support blocks perpendicular to the surface thereof and facing the semi-circular side members of the saddle, and sized to the fully extended and touching the surface of the side members when in a neutral state, so that fore and aft movement of the shaft and saddle will compress the switches and provide an up and down signal to the computer, and wherein the turn switches under the flat plates are mounted at an angle from vertical but still in a parallel plane with the blocks, so that when the saddle rotates and the spring is fully compressed, the switch is at a right angle to the plane of the plate, and wherein each of the springs has a return spring of sufficient size to rebound after compression and return the control shaft to a neutral position.

2. The flight simulation control apparatus of claim 1, wherein the LED's on the console are actuated by the same switches which provide input to the computer.

3. The flight simulation control apparatus of claim 2, wherein the throttle switches are reed switches which are closed by contact with a cam member at the end of the throttle lever.

4. The flight simulation control apparatus of claim 3, wherein the throttle lever has a return spring which returns the lever to a neutral position in which neither throttle switch is actuated.

5. The flight control simulation apparatus of claim 4, wherein the firing buttons are located on the upper ends of the U shaped control yoke.

6. The flight control simulation apparatus of claim 5, wherein the wiring harness terminates at the computer end with a standard, two joystick, game port connector.

7. The flight control simulation apparatus of claim 5, wherein the wiring harness terminates at the computer end with two joystick connectors for connection to two separate joystick ports.

* * * * *